United States Patent [19]

Steele et al.

[11] Patent Number: 5,264,250

[45] Date of Patent: Nov. 23, 1993

[54] ANTIMICROBIAL HYDROPHILIC COATING

[75] Inventors: John W. Steele, Torrington; Philip J. Birbara, Windsor Locks; Robert W. Marsh, Simsbury; Timothy D. Scull, Riverton, all of Conn.

[73] Assignee: United Technologies Corporation, Hartford, Conn.

[21] Appl. No.: 924,993

[22] Filed: Aug. 5, 1992

Related U.S. Application Data

[62] Division of Ser. No. 846,457, Mar. 4, 1992.

[51] Int. Cl.$^5$ .............................................. C09D 5/14
[52] U.S. Cl. ................................ 427/380; 106/15.05
[58] Field of Search ................ 427/379, 380, 397.7; 106/15.05; 165/133

[56] References Cited

U.S. PATENT DOCUMENTS

| | | | |
|---|---|---|---|
| 3,092,552 | 6/1963 | Romaus | 167/72 |
| 3,658,581 | 4/1972 | Paul et al. | 117/169 R |
| 3,868,830 | 3/1975 | Fletcher et al. | 62/290 |
| 4,677,143 | 6/1987 | Laurin et al. | 106/15.05 |
| 4,780,317 | 10/1988 | Sekikawa et al. | 424/468 |
| 4,830,101 | 5/1989 | Ohara et al. | 165/133 |
| 4,847,002 | 7/1989 | Trumble et al. | 106/15.05 |
| 4,883,534 | 11/1989 | Sandham et al. | 106/35 |
| 5,006,554 | 4/1991 | Dooley et al. | 106/15.05 |
| 5,014,774 | 5/1991 | Siak et al. | 165/133 |
| 5,035,282 | 7/1991 | Kawashita et al. | 165/133 |
| 5,042,575 | 8/1991 | Lindsay | 165/133 |

FOREIGN PATENT DOCUMENTS

| | | | |
|---|---|---|---|
| 59-107198 | 6/1984 | Japan | 165/133 |
| 63-279098 | 11/1988 | Japan | 165/133 |
| 1-306993 | 12/1989 | Japan | 106/15.05 |

Primary Examiner—Shrive Beck
Assistant Examiner—Erma Cameron

[57] ABSTRACT

Heat transfer surfaces in condensing heat exchangers are often coated with a hydrophilic coating to provide wetting and wicking. This coating is typically porous and continuously moist during operation and, therefore, a potential breeding ground for microbes. The inclusion of an antimicrobial agent, such as silver oxide, in the coating inhibits microbial growth and improves adhesion to the heat transfer surfaces.

8 Claims, 3 Drawing Sheets

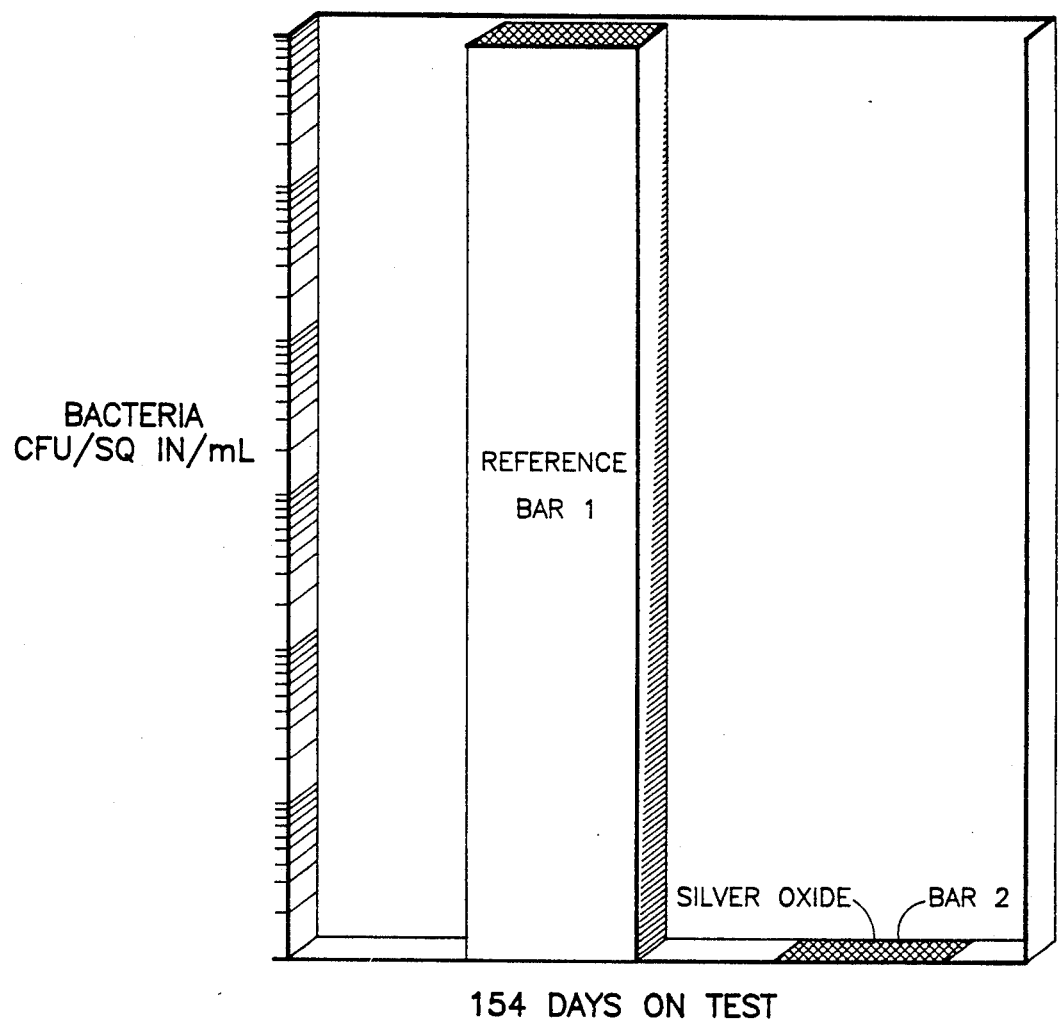

ANTIMICROBIAL HYDROPHILIC COATING

This is a division of copending application Ser. No. 07/846,457 filed on Mar. 4, 1992.

TECHNICAL FIELD

The present invention relates to a coating, and more particularly to a coating having hydrophilic and biocidal characteristics.

BACKGROUND ART

Zero gravity operation of various equipment requires modifications of its conventional counterparts. For example, in a gravity environment, heat can be removed from a gaseous stream with a conventional condensing heat exchanger (hereinafter referred to as condenser). Upon the removal of the heat, a condensate forms and drains to the bottom of the condenser. However, in zero gravity, this condensate will not automatically drain from the condenser since there are no gravitational forces drawing the condensate to the bottom. Instead, the condensate will form droplets which will block the gaseous flow through portions of the condenser. As a result, the condensate droplets can be forced out of the condenser by the gaseous flow in what is referred to as condensate "carry over". Therefore, additional equipment is required to remove the condensate from the condenser.

In order to minimize this "carry over" in zero gravity, many condenser heat transfer surfaces are coated with a hydrophilic coating. This hydrophilic coating causes wetting and wicking, thereby inducing condensate in the condenser to form a thin spreading film in the coating which can readily be collected. This thin film is collected through "slurper" holes into a gas-liquid phase separator which keeps water droplets from being entrapped in the gaseous stream from which it was removed. (see U.S. Pat. No. 3,868,830.)

U.S. Pat. No. 3,658,581 (incorporated by reference) to Paul et al. discloses a hydrophilic passive coating which facilitates wetting and wicking on heat transfer surfaces. The hydrophilic qualities of this passive coating result from the chemical polarity of uncoated silica or calcium silicate dispersed in a non-crystalline binder and from the capillary attraction of the water molecules for one another. The silica and calcium silicate particles have a polar attraction to hydroxyl ions in the condensate water and thereby pull the water to the coating, known as wetting. Wicking or capillary attraction then comes into play as the water being drawn into the coating pulls additional water along with it.

Due to the porous characteristic of this hydrophilic coating, however, it can potentially entrap organic, inorganic and microbial contaminants. As a result, the coated heat transfer surfaces constitute ideal locations for microbial proliferation which can reduce the hydrophilic properties of the coating, plug slurper holes, and corrode the heat transfer surfaces, thereby decreasing the heat transfer efficiency of the condenser. Additionally, if these microbes become air borne, they can be inhaled and cause adverse health effects and they can result in odor generation in the gaseous stream exiting the condenser. As a result, microbial proliferation constitutes heat transfer efficiency, health, and comfort concerns in relation to condensers, especially condensers which operate within a closed environment.

Since the coating disclosed in Paul et al. has generally only been utilized for about 7 to 10 consecutive days, microbial proliferation has not been a great concern. After use, these condensers and the heat transfer surfaces would dry, thereby inhibiting microbial proliferation. However, in applications where the condenser will be utilized for extended periods of time, such as on a space station for 10 years or more, microbial proliferation becomes a major concern. Consequently, what is needed in the art is an antimicrobial additive for the hydrophilic coating used on heat transfer surfaces which does not adversely affect wetting and wicking characteristics.

DISCLOSURE OF THE INVENTION

The present invention relates to an antimicrobial hydrophilic coating. This coating is comprised of an adhesive agent, an inorganic oxide, an inorganic compound, and an antimicrobial agent.

The present invention also relates to a condensing heat exchanger whose heat transfer surfaces are coated with an antimicrobial hydrophilic coating. This antimicrobial hydrophilic coating is comprised of an adhesive agent, an inorganic oxide, an inorganic compound, and an antimicrobial agent.

The present invention further relates to a method for coating heat transfer surfaces of a condensing heat exchanger with an antimicrobial hydrophilic coating. This coating process is comprised of flowing the coating in the form of a slurry through said condensing heat exchanger and allowing said slurry to intimately contact and coat said heat transfer surfaces. Finally, the coated heat transfer surfaces are heated to dry and cure said slurry.

The foregoing and other features and advantages of the present invention will become more apparent from the following description and accompanying drawings.

BRIEF DESCRIPTION OF THE DRAWINGS

FIG. 3 is a graph showing microbial growth after a period of 154 days on a reference coated test panel versus a test panel coated with the antimicrobial hydrophilic coating of the present invention.

BEST MODE FOR CARRYING OUT THE INVENTION

Figure 1:
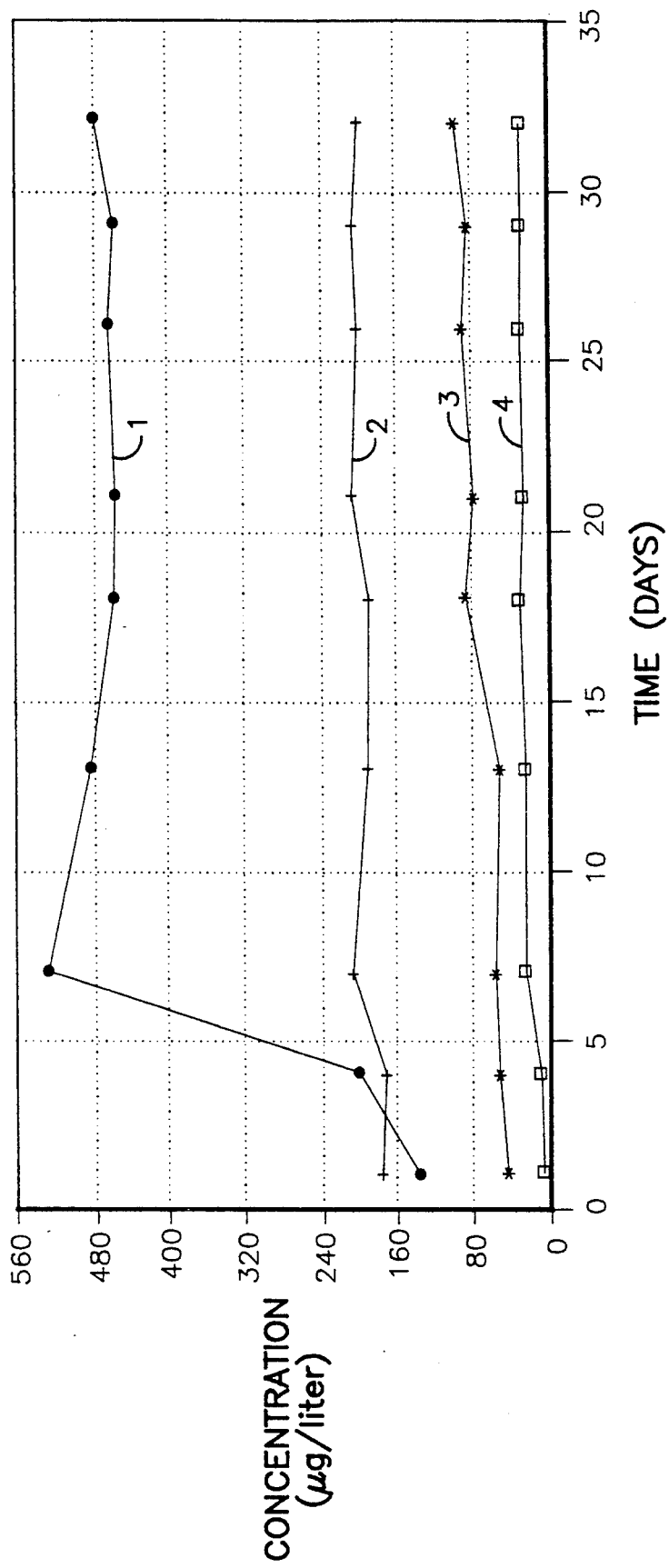
FIG. 1 is a graph of the dissolution equilibrium of the various constituents in the antimicrobial hydrophilic coating of the present invention.

Although the antimicrobial hydrophilic coating of the present invention will be described in reference to coating heat transfer surfaces in a condenser, it is not limited thereto. This antimicrobial hydrophilic coating can be utilized on any surface in which wetting and wicking, and the inhibition of microbial proliferation are desired.

The hydrophilic characteristics of the coating of the present invention are provided by an inorganic compound which increases the surface energy of the heat transfer surfaces. The inorganic compound provides a very high surface energy or polarity to the coating, inducing an "attraction" for anions such as hydroxyl ions. As a result, this polar surface causes a low interfacial energy between the condensate and the heat transfer surfaces, thereby effecting the desired wetting. After the surface is wetted, the water thereon wicks into the inherently porous coating through capillary action. The water drawn into the pores of the coating draws other water molecules into the coating through inter-molecule attraction.

The inorganic compound must facilitate wetting, not impart a hydrophobic characteristic to the coating, have an equilibrium dissolution rate similar to other components of the coating, and have a low solubility in water. A few such inorganic compounds include uncoated silica, calcium silicate particles, and mixtures thereof.

Since this inorganic compound typically lacks structural integrity, it is combined with a binder. The concentration of the inorganic compound is, therefore, a balance between coating structural integrity and desired wetting and wicking characteristics. Inorganic compound concentrations can range from about 10.0 weight percent (wt %) to about 20.0 wt %, based upon the total weight of the coating in the form of a slurry (a stage of preparation further described below), including the inorganic compound, the binder, an antimicrobial agent, and water. It is believed that inorganic compound concentrations below about 5 wt % will not exhibit sufficient hydrophilic properties and that concentrations above about 30 wt % will produce a coating with poor structural integrity which will flake and quickly degrade. Inorganic compound concentrations ranging from about 11.0 wt % to about 16.0 wt % have proven particularly useful, with about 14.0 wt % to about 15.0 wt % preferred.

It is further preferred that the inorganic compound have an average particle size of about 6.0 microns to about 14 microns, with about 8 microns to about 10 microns especially preferred. Particle sizes within these ranges increase slurry life, decrease separation of the components of the slurry, and simplify mixing of the slurry.

The binder consists of a combination of an adhesive agent and an insolubilizer. This binder provides structural integrity to the coating by binding it together, and good adherence to and uniformity of coverage of the heat transfer surfaces.

The adhesive agent used in the binder actually provides the structural integrity to the coating by binding the coating together and preventing flaking and cracking. This adhesive agent provides structural integrity without adversely affecting the hydrophilic properties of the coating. Typically the adhesive agent is potassium silicate, lead borosilicate glass frit, or mixtures thereof. One such adhesive agent is Kasil ® #1 produced by Philadelphia Quartz Co., Philadelphia, Pa. Kasil #1 contains 20.8 wt % silica, 8.3 wt % potassium oxide, balance water. The concentration of adhesive agent versus the total weight of the slurry is typically, between about 20 wt % and about 30 wt %, with between about 24 wt % and about 29 wt % preferred, and about 25 wt % to about 26 wt % especially preferred. It is believed that greater than about 40 wt % adhesive agent will adversely effect the hydrophilic abilities of the coating, while concentrations less than about 15 wt % will show poor structural integrity.

During preparation of the coating, the adhesive agent is generally in the form of a water soluble material. As a result, coating preparation requires conversion of the adhesive agent from a water soluble material to a water insoluble material with an insolubilizer which does not adversely effecting the coating. As with the inorganic compound, the insolubilizer preferably has an average particle size of about 6.0 microns to about 14 microns, with about 8 microns to about 10 microns especially preferred due to improved slurry life and simplified slurry preparation.

Possible insolubilizers include silicofluorides ($SiF_6$) of sodium, potassium, barium, manganese, and mixture thereof, and inorganic oxides such as zinc oxide, among others. One such inorganic oxide is Kadox ® 15, 99% pure zinc oxide, produced by New Jersey Zinc Co, Ogdensborg, N.J. Particularly with the silicofluoride insolubilizers, sodium hydroxide can be used as a colloidal dispersant. Concentrations of inorganic oxides based upon the total weight of the slurry, can range from about 10 wt % to about 20 wt %, with between about 10 wt % and about 15 wt % preferred, and about 12.5 wt % to about 13.5 wt % especially preferred.

Also combined with the inorganic compound and the binder is an antimicrobial agent which provides the biocidal characteristics to the coating. In order to prevent microbial proliferation, the antimicrobial agent is preferably a substance which slowly dissolves into the condensate and inhibits microbial growth by attacking the cellular DNA of microorganisms. Conventional biocides which do not interfere with the hydrophilic characteristics of the coating and which have an equilibrium dissolution rate similar to that of the inorganic compound and the binder can be employed.

If the antimicrobial agent dissolves into the condensate at a faster rate than the inorganic compound and the binder, pitting can occur in the coating thereby reducing the hydrophilic characteristics and structural integrity thereof and the heat transfer efficiency of the condenser. For example, if silver oxide is utilized as the antimicrobial agent, it slowly dissolves into the condensate in the form of silver ions. These silver ions diffuse through the cell walls of the microbes and complex with the cellular DNA therein. This complex formation interrupts the normal role of DNA and thus prevents reproduction of the microbe.

Possible antimicrobial agents include salts such as arsenic salts, iodine salts, iron salts, mercury salts, silver salts, tin salts, and mixtures thereof, with mercury salts and silver salts preferred, and silver salts especially preferred. A silver salt which has proven particularly useful as an antimicrobial agent having an appropriate equilibrium dissolution rate is silver oxide which can be purchased from Mallinckrodt Co., Paris, Ky., in a purified powder form.

Silver oxide not only acts as an antimicrobial agent which does not inhibit the hydrophilic characteristics of the coating, it additionally improves the adhesive properties of the coating to the heat transfer surfaces. During adhesion integrity testing of the coating using tape tests, the amount of coating loss was minimal in the coating with the silver oxide compared to a coating without silver oxide. The coating with the silver oxide had about 10% to about 20% greater adhesion than the other coating, with the percent of adhesion based upon the weight of coating pulled off of the test samples by the tape. Therefore, the coating with silver oxide had about 10 wt % to about 20 wt % less coating removed by the tape than the coating without silver oxide.

It should be noted, however, that silver oxide levels of about 1.0 wt % and greater can adversely effect the hydrophilic characteristics of the coating. On the other hand, silver oxide levels below about 0.1 wt % will exhibit only minimal biocidal properties. Therefore, it is preferred to utilize between about 0.3 wt % and 0.7 wt % silver oxide, with about 0.45 wt % to about 0.55 wt % especially preferred. (Weight percents based upon the total weight of the slurry.)

Again, as with the inorganic compound and the insolubilizer, the antimicrobial agent also preferably has an average particle size of about 6.0 microns to about 14 microns, with about 8 microns to about 10 microns especially preferred. As is stated above, particle sizes in this range increase the slurry life, components do not separate out as quickly, and the slurry is easier to mix.

Typically, during preparation of the coating, the antimicrobial agent is combined with the inorganic compound and the binder in a solvent which does not adversely effect the final coating, to form a slurry. This solvent is typically water or a water based solvent. The solvent concentration generally ranges from about 30 wt % to about 70 wt % with between about 35 wt % and about 55 wt % preferred, based upon the total weight of the slurry.

The slurry is mixed until essentially homogenous and then preferably utilized before its components aggregate creating component rich and component devoid areas in the coating. As a result, the slurry is preferably utilized within approximately 15 minutes.

Application of the coating to the heat transfer surfaces can be accomplished in various manners all of which are conventional. These conventional processes include dipping, spraying, and painting the heat transfer surfaces with the slurry, flowing the slurry through the condenser and allowing it to remain a sufficient period of time to coat the heat transfer surfaces, and other common coating techniques.

The preferred thickness of the coating is dependent upon the application. It is believed that the thickness of the coating will not effect the antimicrobial and hydrophilic characteristics thereof. In a condenser, however, when the coating thickness is above about 500 microns, the heat transfer ability of the heat transfer surfaces, commonly known as fin stock, can be adversely effected due to plugging and prevention of water flow, thereby decreasing the efficiency of the condenser. On the other hand, if the coating is too thin, less than about 100 microns, the life of the coating may decrease since the coating slowly dissolves into the water. Therefore, for the coating on condenser heat transfer surfaces, formed by the flow through method, the coating thickness typically ranges from about 100 microns to about 500 microns.

Once the coating has been applied it must be dried and cured. Ultimately, complete removal of the water and complete curing of the coating is desired. Various manners of accomplishing water removal and curing include the use of a vacuum, flowing dry air over the coating, and heating the coating to a temperature which will induce curing without sintering, or conventional water removal and curing techniques. Since water evaporates at 212° F., if the temperature of the coating is rapidly raised to above about 230° F., the water will rapidly vaporize thereby causing cracks and flaking in the coating. As a result, it is preferred to slowly raise the temperature of the coating to about 500° F. either sequentially or very slowly over a period of about 1 to about 6 hours. Sequential curing can consist of between 2 and 8 sequential temperature steps or more, the first sequence remaining below about 212° F. for about 1.0 to about 3.0 hours and a final step at about 500° F. for between about 1.0 to about 4.0 hours with possible steps in between.

One possible curing sequence includes heating the coating to a range of about 175° F. to about 185° F. for between about 0.25 and about 1.0 hours, to a range of about 195° F. to about 205° F. for between about 0.5 and about 1.5 hours, to a range of about 215° F. to about 225° F. for between about 0.25 and about 1.0 hours, to a range of about 245° F. to about 255° F. for between about 0.25 and 1.0 hours, to a range of about 295° F. to about 305° F. for between about 0.5 and about 1.5 hours, and to about 500° F. for between about 1.5 and about 2.5 hours. Another possible curing sequence comprises slowly, over a period of about 2.0 hours, raising the temperature of the coating to between about 200° F. and about 215° F., then increasing the temperature to about 500° F. over a second period of about 2.0 hours, and finally maintaining the temperature at about 500° F. for about 2.0 hours.

The present invention will be clarified by reference to the following illustrative example. The example is given to illustrate a method for preparing the antimicrobial, hydrophilic coating of the present invention. It is not, however, intended to limit the generally broad scope of the present invention.

EXAMPLE

The following example was used to prepare an antimicrobial hydrophilic coating for stainless steel heat transfer surfaces.

1. In a blender, preferably a Waring model CB5 one gallon size three speed commercial type blender, 46.5 grams (g) of water, 22.5 g of Kasil #1, 14.5 g of silica flour, 13.0 g of Kadox 15, and 0.5 g silver oxide were combined.

2. These components were then blended on low speed for approximately 20 seconds to form a homogenous slurry.

3. The slurry was applied to a test panel by dipping the test panel into the slurry (within 15 minutes of mixing) to form a coating thereon.

4. Finally, the coating was cured at 185° F. for 0.5 hours, 205° F. for 1.0 hours, 225° F. for 0.5 hours, 255° F. for 0.5 hours, 305° F. for 1.0 hours, and 500° F. for 2.0 hours.

The results of tests performed on test panels formed from the above Example can be seen in the Figures described below.

Referring to FIG. 1, which is meant to be exemplary, not limiting, the equilibrium dissolution concentration of the various components of the coating of the Example are noted. Line 1 refers to the silica having an equilibrium dissolution concentration of about 480 parts per billion (ppb). Line 2 refers to the Kasil ® having an equilibrium dissolution concentration of about 200 ppb. Line 3 refers to the Kadox ® having an equilibrium dissolution concentration of about 80 ppb. Finally, line 4 refers to the silver oxide having an equilibrium dissolution concentration of about 20 ppb. It can be noted from the graph that all of the components of the coating dissolve into the condensate at the same relative rate.

Figure 2:
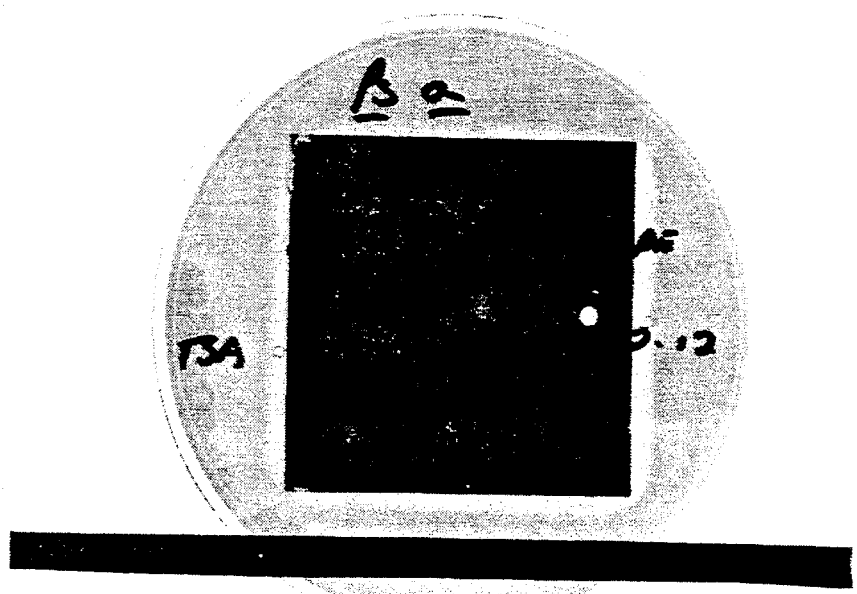
FIG. 2 is a photograph of the zone of inhibition which formed around a test panel coated with the antimicrobial hydrophilic coating of the present invention.

FIG. 2, which is meant to be exemplary not limiting, is a photograph of the zone of inhibition which formed around test panel coated with the coating of the Example. The test panel having an approximately 100 to 500 micron thick antimicrobial hydrophilic coating on its surface was placed in a Petri dish containing Pseudomonas subspecies ($10^8$ to $10^9$ colony forming units per milliliter (CFU/ml)) imbedded in a nutrient agar to determine if the Pseudomonas subspecies could proliferate on and around the coating. This test is the standard for determining resistance of plastics to bacteria as established by the American Society for Testing Materials (ASTM G22-76). As can be seen by the lighter colored agar surrounding the test panel, there is a zone of inhibition where the antimicrobial agent prevented the proliferation of the Pseudomonas subspecies.

Finally, FIG. 3, which is meant to be exemplary not limiting, compares the results of microbial growth on a surface coated with the hydrophilic coating composed of silica, Kasil ®, and Kadox ®, bar 1, compared to a surfaced coated with the antimicrobial hydrophilic coating of the Example, bar 2, after a period of 154 days. The hydrophilic coated surface, bar 1, experienced microbial proliferation of more than six orders of magnitude greater than that experienced by the antimicrobial hydrophilic coated surface, bar 2. The antimicrobial hydrophilic coating of the present invention significantly inhibits microbial proliferation.

The advantages of the present invention are readily apparent in view of prior art coatings. For example, the present invention is an antimicrobial hydrophilic coating which has improved adhesion and allows wetting and wicking while preventing microbial proliferation. Although some prior art coatings were able to achieve wetting and wicking, they failed to prevent microbial proliferation. As a result, the heat transfer efficiency of the prior art condensing heat exchangers diminished and health problems were often experienced.

The antimicrobial hydrophilic coating of the present invention will inhibit microbial proliferation and provide the desired wetting and wicking on heat transfer surfaces for a calculated 10 or more years. This antimicrobial hydrophilic coating is particularly beneficial for use in condensing heat exchangers utilized in zero or micro gravity applications for extended periods of time and with relation to a space station.

Although this invention has been shown and described with respect to detailed embodiments thereof, it will be understood by those in the art that various changes in form and detail thereof may be made without departing from the spirit and scope of the claimed invention.

We claim:

1. A method for coating heat transfer surfaces of a condensing heat exchanger with an antimicrobial hydrophilic coating, comprising the steps of:
    a. flowing the coating in the form of a slurry through said condensing heat exchanger, wherein said slurry intimately contacts and coats said heat transfer surfaces; and
    b. heating said coated heat transfer surfaces to dry and cure said slurry thereby forming a coating on said heat transfer surfaces,
wherein said slurry is comprised of:
    a. an adhesive agent;
    b. an insolubilizer;
    c. an inorganic compound wherein said inorganic compound is selected from the group consisting of silica, calcium silicate, and mixtures thereof;
    d. from about 0.1 wt. % to about 1.0 wt. %, based upon the total weight of the slurry, of silver oxide; and
    e. a solvent;
whereby said adhesive agent, said insolubilizer, said inorganic compound, and said silver oxide are dispersed in said solvent thereby forming a slurry which is essentially homogeneous.

2. A method for coating heat transfer surfaces as in claim 1 further comprising the steps of sequentially heating said coated heat transfer surfaces, wherein said sequential heating is comprised of heating said heat transfer surfaces to a range of about 175° F. to about 185° F. for between about 0.25 hrs and 1.0 hrs, to a range of about 195° F. to about 205° F. for between about 0.5 hrs and about 1.5 hrs, to a range of about 215° F. to about 225° F. for between about 0.25 hrs and about 1.0 hrs, to a range of about 245° F. to about 255° F. for between about 0.25 hrs and about 1.0 hrs, to a range of about 295° F. to about 305° F. for between about 0.5 hrs and about 1.5 hrs, and to about 500° F. for between about 1.5 hrs and about 2.5 hrs.

3. A method for coating heat transfer surfaces as in claim 1 wherein said slurry intimately contacts said heat transfer surfaces for about 10 minutes to about 20 minutes before said heat transfer surfaces are heated.

4. A method for coating heat transfer surfaces as in claim 1, wherein said solvent is water.

5. A method for coating heat transfer surfaces as in claim 1, wherein said adhesive agent is selected from the group consisting of potassium silicate, borosilicate glass, and mixtures thereof.

6. A method for coating heat transfer surfaces as in claim 1, wherein said insolubilizer is selected from the group consisting of zinc oxide, and silicofluorides of sodium, potassium, barium, manganese, and mixtures thereof.

7. A method for coating heat transfer surfaces as in claim 4, wherein said slurry contains between about 20.0 wt % and about 30.0 wt % of said adhesive agent, between about 10.0 wt % and about 20.0 wt % of said insolubilizer, between about 10.0 wt % and about 20.0 wt % of said inorganic compound, between about 0.3 wt % and about 0.7 wt % of said silver oxide, balance water.

8. A method for coating heat transfer surfaces as in claim 4, wherein said slurry contains about 25 wt % to about 26 wt % of said adhesive agent, about 12.5 wt % to about 13.5 wt % of said insolubilizer, about 14.0 wt % to about 15.0 wt % of said inorganic compound, and about 0.45 wt % to about 0.55 wt % of said silver oxide, balance water.

* * * * *